United States Patent
Huang et al.

(10) Patent No.: US 10,191,731 B2
(45) Date of Patent: Jan. 29, 2019

(54) SAFE AND AGILE ROLLOUTS IN A NETWORK-ACCESSIBLE SERVER INFRASTRUCTURE USING SLICES

(71) Applicant: Microsoft Technology Licensing, LLC, Redmond, WA (US)

(72) Inventors: Huaming Huang, Sammamish, WA (US); Yue Zhao, Redmond, WA (US); Muhammad Usman Sharif, Bothell, WA (US); Abhishek Singh, Redmond, WA (US); Avnish Kumar Chhabra, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/635,084

(22) Filed: Jun. 27, 2017

(65) Prior Publication Data
US 2018/0373521 A1 Dec. 27, 2018

(51) Int. Cl.
*G06F 9/445* (2018.01)
*G06F 8/65* (2018.01)
*H04L 29/08* (2006.01)

(52) U.S. Cl.
CPC ............ *G06F 8/65* (2013.01); *H04L 67/34* (2013.01)

(58) Field of Classification Search
CPC ............ H04L 67/34; G06F 8/60; G06F 8/65
USPC ........................ 717/169, 172, 177
See application file for complete search history.

(56) References Cited

U.S. PATENT DOCUMENTS

| | | | | |
|---|---|---|---|---|
| 6,606,744 B1 * | 8/2003 | Mikurak | ............... | H04L 29/06 717/174 |
| 8,266,260 B2 * | 9/2012 | Pathak | ............... | G06F 8/65 709/219 |
| 8,516,477 B1 * | 8/2013 | Kearns | ............... | G06F 8/65 717/174 |
| 8,782,632 B1 * | 7/2014 | Chigurapati | ............... | G06F 8/65 717/172 |
| 9,141,373 B2 | 9/2015 | Capper | | |
| 9,229,707 B2 * | 1/2016 | Borissov | ............... | G06F 8/67 |

(Continued)

OTHER PUBLICATIONS

"RollingUpdates", https://cloud.google.com/compute/docs/instance-groups/updater/v1beta1/rollingUpdates, Published on: Apr. 6, 2015, 6 pages.

(Continued)

*Primary Examiner* — Marina Lee
(74) *Attorney, Agent, or Firm* — Fiala & Weaver P.L.L.C.

(57) ABSTRACT

Methods, systems, and apparatuses manage rolling out of updates in a network-accessible server infrastructure which operates a plurality of instances of a supporting service. The supporting service is comprised by a plurality of service portions. The instances of the supporting service each include one of the service portions. The instances of the supporting service are partitioned into a plurality of slices. Each instance is partitioned to include one or more of the slices, and each slice of an instance includes one or more of the service portions. A software update is deployed to the instances by applying the software update to the slices in a sequence such that the software update is applied to a same slice in parallel across the instances containing that same slice before being applied to a next slice, and waiting a wait time before applying the software domain to a next slice in the sequencing.

20 Claims, 8 Drawing Sheets

(56) References Cited

U.S. PATENT DOCUMENTS

| | | | |
|---|---|---|---|
| 9,729,421 B2* | 8/2017 | Brech | H04L 43/14 |
| 2009/0100420 A1 | 4/2009 | Sapuntzakis et al. | |
| 2009/0144720 A1 | 6/2009 | Roush et al. | |
| 2009/0150878 A1* | 6/2009 | Pathak | G06F 8/65 717/172 |
| 2010/0058318 A1 | 3/2010 | Bemabeu-Auban et al. | |
| 2012/0185913 A1* | 7/2012 | Martinez | G06F 9/455 726/1 |
| 2013/0055155 A1 | 2/2013 | Wong et al. | |
| 2013/0151681 A1 | 6/2013 | Dournov et al. | |
| 2014/0033188 A1 | 1/2014 | Beavers et al. | |
| 2014/0156847 A1 | 6/2014 | Moscibroda et al. | |
| 2014/0189677 A1 | 7/2014 | Curzi et al. | |
| 2014/0280961 A1* | 9/2014 | Martinez | H04L 41/5054 709/226 |
| 2016/0034334 A1 | 2/2016 | Sadovsky et al. | |
| 2016/0216958 A1 | 7/2016 | Kurian et al. | |
| 2017/0168810 A1* | 6/2017 | Knijnenburg | G06F 8/65 |

OTHER PUBLICATIONS

Bigelow, Stephen J., "Improve application rollout planning with advanced options", http://searchitoperations.techtarget.com/tip/Improve-application-rollout-planning-with-advanced-options, Published on: Nov. 9, 2016, 5 pages.

"Schedule Production Rollout in Stages", https://technet.microsoft.com/en-us/library/cc977695.aspx, Published on: Apr. 10, 2009, 1 pages.

Dean, et al., "PerfCompass: Online Performance Anomaly Fault Localization and Inference in Infrastructure-as-a-Service Clouds", In Journal of IEEE Transactions on Parallel and Distributed Systems, vol. 27, Issue 6, Jun. 1, 2016, pp. 1-6.

Iulian Neamtiu, et al., "Cloud software upgrades: Challenges and opportunities", 2011 International Workshop on the Maintenance and Evolution of Service-Oriented and Cloud-Based Systems, Sep. 26, 2011, 10 Pages.

"International Search Report and Written Opinion Issued in PCT Application No. PCT/US2018/035239", dated Sep. 10, 2018, 14 Pages.

* cited by examiner

200

Receive an indication of a partition of the instances of the supporting service into a plurality of slices, each instance of the supporting service partitioned to include one or more slices of the plurality of slices, each slice of an instance of the supporting service including one or more of the service portions of the instance of the supporting service — 202

Deploy a software update to the plurality of instances of the supporting service — 204

FIG. 2

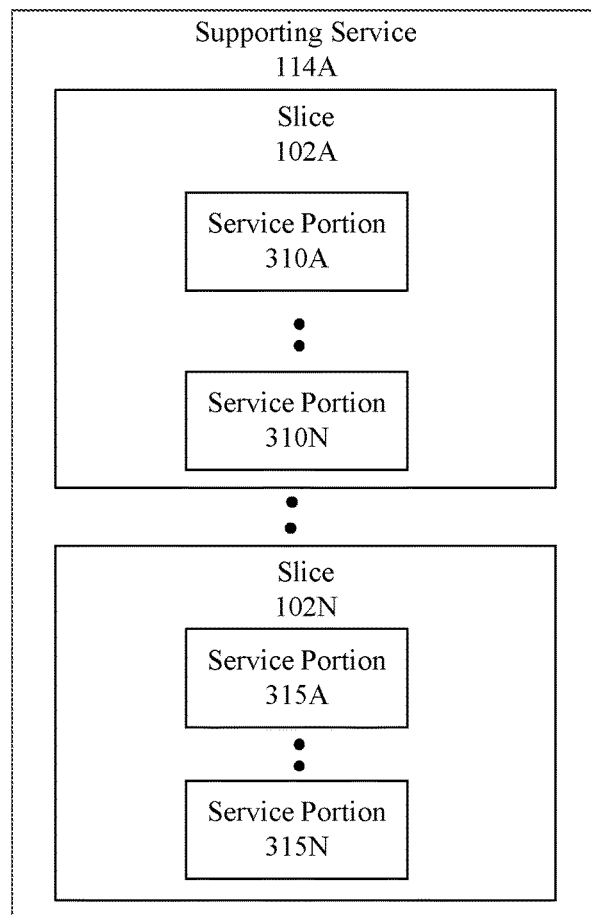

| 502 | Apply the software update to the slices in a sequence such that the software update is applied to a same slice in parallel across the instances of the supporting service containing that same slice before being applied to a next slice, at least a first applied slice in the sequence having substantially complete configuration diversity coverage of the network-accessible server infrastructure |

| 504 | Wait a wait time after each applying of the software update to a slice of the plurality of slices before applying the software domain to a next slice of the plurality of slices in the sequence |

| 602 | Slice the instances of the supporting service into the plurality of slices |

| 702 | Configure the plurality of slices to have substantially complete configuration diversity coverage |

FIG. 7

SAFE AND AGILE ROLLOUTS IN A NETWORK-ACCESSIBLE SERVER INFRASTRUCTURE USING SLICES

BACKGROUND

Cloud computing is a form of network-accessible computing that provides shared computer processing resources and data to computers and other devices on demand over the Internet. Cloud computing enables the on-demand access to a shared pool of configurable computing resources, such as computer networks, servers, storage, applications, and services. The resources can be rapidly provisioned and released to a user with reduced management effort relative to the maintenance of local resources by the user. In some implementations, cloud computing and storage enables users, including enterprises, to store and process their data in third-party data centers that may be located far from the user, including distances that range from within a same city to across the world. The reliability of cloud computing is enhanced by the use of multiple redundant sites, where multiple copies of the same applications/services may be dispersed around different data centers (or other cloud computing sites), which enables safety in the form of disaster recovery when some cloud computing resources are damaged or otherwise fail.

Cloud applications and platforms usually have some notion of fault isolation in them by segregating resources into logical divisions. Each logical division may a corresponding number and variety of resources, and may be duplicated at multiple sites. Such resources, such as servers, switches, and other computing devices that run software and/or firmware, may need to be periodically updated with the latest software/firmware. When dealing with a single service, the update strategy is relatively simple: update the service in isolation at one logical division to see if the changes work, then release the update to other logical divisions. The greater the number of services/applications needing to be updated, and the greater the number of different hardware configurations running the services/applications, the greater the deployment time of the updates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for rolling out updates to a network-accessible server infrastructure which operates multiple instances (deployed copies) of a supporting service. The supporting service is defined by a plurality of service portions. Each instance of the supporting service includes the plurality of service portions. An indication of a partition of the instances of the supporting service into a plurality of slices is received. Each instance of the supporting service is partitioned to include one or more slices of the plurality of slices. Each slice of an instance of the supporting service includes one or more of the service portions of the instance of the supporting service.

A software update can be deployed to the instances of the supporting service. The software update is deployed by applying the software update to the slices in a sequence such that the software update is applied to a same slice in parallel across the instances of the supporting service containing that same slice before being applied to a next slice. The first slice in the sequence has substantially complete configuration diversity coverage of the network-accessible server infrastructure (and further slices in the sequence may also have substantially complete coverage). A wait time is waited after each applying of the software update to a slice of the plurality of slices before applying the software domain to a next slice of the plurality of slices in the sequence.

In this manner, the update can be applied to the network-accessible server infrastructure in an incremental manner, finding failures in the update early, confining such failures to a relatively limited portion of the infrastructure, with increasing confidence with each slice in the sequence that problems with the updated with be minimal. The update can be applied across the network-accessible server infrastructure relatively fast in his manner, including by enabling reduced wait times and/or the use of progressively larger slices.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a flowchart for rolling out updates to a network-accessible server infrastructure, according to an example embodiment.

FIG. 3A shows a block diagram of a supporting service partitioned into slices that each include portions of the supporting service, according to an example embodiment.

FIG. 5 shows a flowchart for deploying a software update across slices, according to an example embodiment.

FIG. 6 shows a flowchart for forming slices, according to an example embodiment.

FIG. 7 shows a flowchart for forming slices having substantially complete configuration diversity of a target network-accessible server platform, according to an example embodiment.

Figure 1:
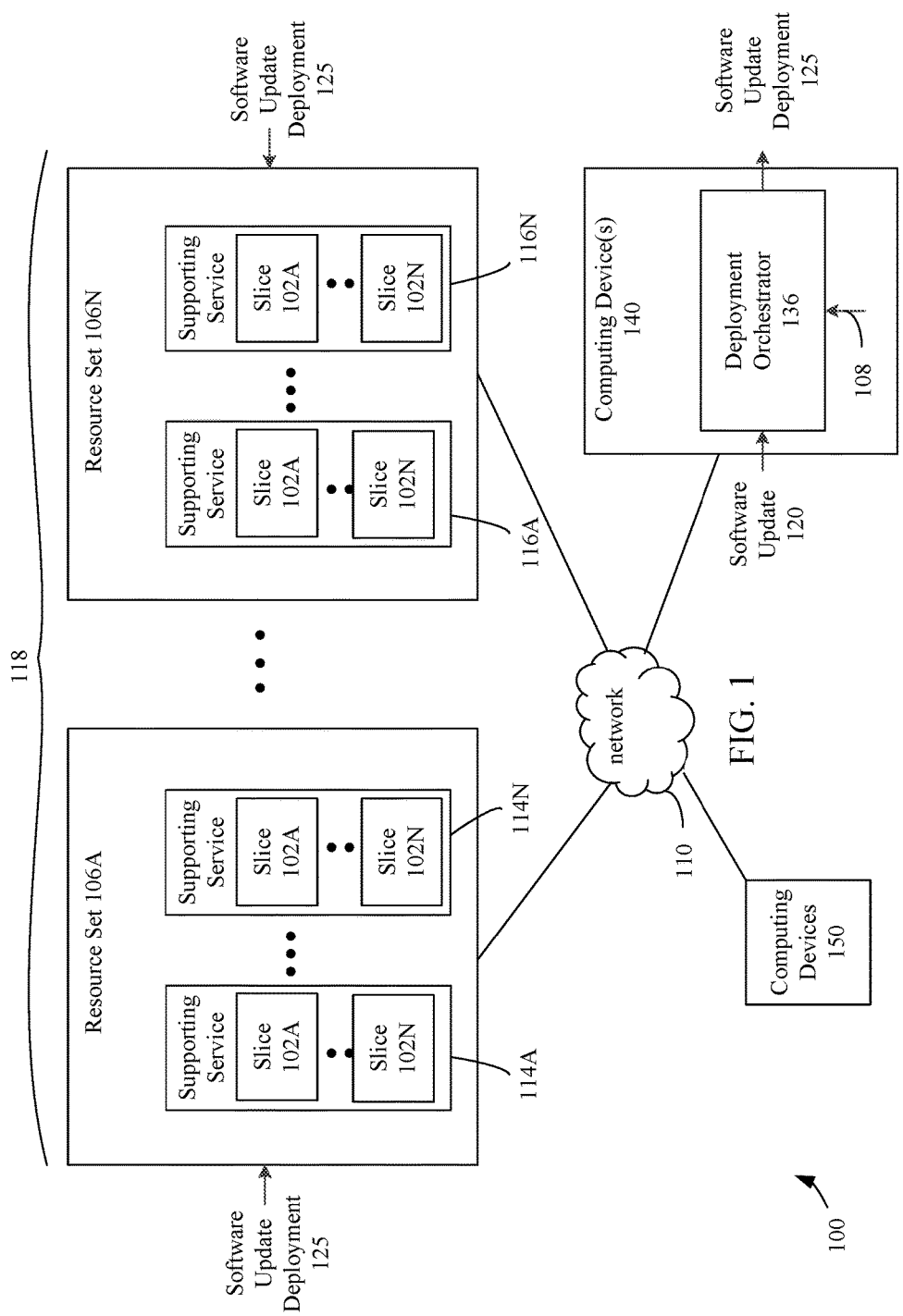
FIG. 1 shows a block diagram of a system for rolling out updates to a network-accessible server infrastructure, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up." "left," "right," "down," "top," "bottom." "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud computing is a form of network-accessible computing that provides shared computer processing resources and data to computers and other devices on demand over the Internet. Cloud computing enables the on-demand access to a shared pool of configurable computing resources, such as computer networks, servers, storage, applications, and services, which can be rapidly provisioned and released to a user with reduced management effort relative to the maintenance of local resources by the user.

Cloud applications and platforms usually have some notion of fault isolation in them by segregating resources into logical divisions. Each logical division may a corresponding number and variety of resources, and may be duplicated at multiple sites. Such resources, such as servers, switches, and other computing devices that run software and/or firmware, may need to be periodically updated with the latest software/firmware. When dealing with a single service, the update strategy is relatively simple: update the service in isolation at one logical division to see if the changes work, then release the update to other logical divisions. The greater the number of services/applications needing to be updated, and the greater the number of different hardware configurations running the services/applications, the greater the deployment time of the updates.

A cloud supporting service is defined herein as the service that manages the network-accessible server infrastructure. Examples of such a supporting service includes Microsoft® Azure®, Amazon Web Services™, Google Cloud Platform™, IBM® Smart Cloud, etc. The supporting service may be configured to build, deploy, and manage applications and services on the corresponding set of servers.

There may be hundreds, thousands, or even greater numbers of instances of the cloud supporting services in operation in a large, worldwide platform of network-accessible servers. Typically, when deploying a software update to such a large number of instances of the supporting service, instead of deploying the software update to all instances in parallel (risking failure at a massive scale if the software update is flawed), the software update is applied to a series of groups of the instances of the supporting service, and time is given after each group to determine whether the updates succeeded. For instance, a first percentage (e.g., 1%) of the instances may be selected to first receive the update. If the update to the first percentage is successful, the update may be applied to a second percentage of the instances (e.g., 10%). If this succeeds, the update may be applied to a third percentage of the instances (e.g., 20%), then a fourth (30%), etc., until the update is applied to all of the instances. This way, any failures in the update may be isolated to a portion of the instances of the supporting service.

Conventionally, the deployment time for each group of instances is kept constant, leading to a very long overall deployment time. Furthermore, the strategy of deploying the software update to groups of instances of the supporting service has increasing risk as the number of instances increases. For example, if there are 10,000 supporting services in operation, and the series of groups to which the update is applied are 100 instances, 1,000 instances, 4,000 instances, and lastly 4,900 instances, this means in the third phase, 4,000 services are updated—a large number of instances—and unless the all hardware/software configuration scenarios (for the servers running the instances of the supporting service) were completely covered in the earlier groups, there is a risk that the 4,000 services may each fail due to some unforeseen reason related to the software update.

Embodiments overcome these issues by, instead of updating solely based on the number of services, defining a unit of supporting services referred to as a slice (also referred to as an "update domain", a partition, etc.). The supporting service is partitioned (sliced) into a sequence of slices, with the first slice, and optionally the subsequent slices in the sequence, having substantially complete configuration diversity coverage of all instances of the supporting services operating in the network-accessible server infrastructure. Instances of the same slice of the supporting service in a same server infrastructure can cover the same or different hardware in different sets of servers (e.g., a slice 1 on server cluster 1 may encompass a single server, while slice 1 on server cluster 2 may encompass two servers). Accordingly, the update of the slice in one cluster may update the corresponding service portion on different hardware than the update of the slice in another cluster. This approach has numerous advantages, including: hardware, software and configuration coverage across the entire fleet of supporting services; being scale free because each slice may have substantially complete configuration diversity coverage, and therefore the total rollout time depends on the configuration of the slices of slices across the supporting service, not on the number of instances of the supporting service in operation; longer bake time and shorter total rollout time, such that the number of slices (e.g., less than 20) is usually far less than the number of instances of the supporting services (e.g., greater than a thousand), and thus a longer bake time can be implemented between slices so that the probability to catch bugs is higher than regular approach. Furthermore, by rolling out software slice-by-slice, a high degree of coverage and parallelization is achieved (e.g., because each slice is updated in parallel across all instances of the slice). Still further, the total rollout time can be decreased because more bugs/problems in or caused by the software update can be captured in the early stage slices, and the overall rollout can be performed faster and safer as the software update deployment progresses. In embodiments, slices can adapt to new hardware and software configurations.

Still further, a mechanism to safely and independently carry out the rollout of the software update without impacting multiple tenant customers in the worst case, can be to restrict the customer impact within a single tenant slice configured to have the highest probability to detect failures in the first slice. No customer/client code needs to be changed, in embodiments.

In an embodiment, a slice definition, including a designation of which servers include in the slice, can be changed dynamically by a user (e.g., a release manager). Furthermore, a user can configure an order of the slice updates, a wait time for each update rollout to a slice, or both. In an embodiment, a slice is scale free and does not increase in size when the number of server clusters increases.

Accordingly, embodiments provide the following (and additional) capabilities pertaining to software update rollouts in a cloud infrastructure: (1) A mechanism to safely and independently carry out the rollout of new features without impacting multiple tenant customers in the worst case; (2) A mechanism to restrict customer impact within a single tenant slice; (3) A mechanism to have relatively high probability of detecting any failures in the first slice to which the software update is applied; (4) A mechanism to keep reducing the probability of failure as the supporting service code executes in a different configuration; and (5) A scale-free mechanism to perform software update rollout with respect to cluster count.

As follows, example embodiments are described herein directed to techniques for rolling out updates to a network-accessible server infrastructure. For instance, FIG. 1 shows a block diagram of an example system 100 for rolling out updates to a network-accessible server infrastructure, according to an example embodiment. As shown in FIG. 1, system 100 includes a plurality of resource sets 106A-106N, one or more computing devices 140, and computing devices 150. Resource sets 106A-106N define a network-accessible server infrastructure 118. Resource sets 106A-106N, computing device(s) 140, and computing devices 150 are communicatively coupled via one or more networks 110. Though computing device(s) 140 are shown separate from resource sets 106A-106N, in an embodiment, computing device(s) 140 may be included as node(s) in one or more of resource sets 106A-106N. Network 110 may comprise one or more networks such as local area networks (LANs), wide area networks (WANs), enterprise networks, the Internet, etc., and may include one or more of wired and/or wireless portions. In an embodiment, computing device(s) 140, computing devices 150, and each resource set of resource sets 106A-106N may communicate via one or more application programming interface (API).

Resource sets 106A-106N may form a network-accessible server set, such as a cloud computing server network. For example, each of resource sets 106A-106N may comprise a group or collection of servers (e.g., computing devices) that are each accessible by a network such as the Internet (e.g., in a "cloud-based" embodiment) to store, manage, and process data. Each of resource sets 106A-106N may comprise any number of servers, and may include any type and number of other resources, including resources that facilitate communications with and between the servers, storage by the servers, etc. (e.g., network switches, storage devices, networks, etc.). Servers of a resource set may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of a resource set may be co-located (e.g., housed in one or more nearby buildings with associated components such as backup power supplies, redundant data communications, environmental controls, etc.) to form a datacenter, or may be arranged in other manners. Accordingly, in an embodiment, resource sets 106A-106N may each be a datacenter in a distributed collection of datacenters.

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

In accordance with such an embodiment, each of resource sets 106A-106N may be configured to service a particular geographical region. For example, resource set 106A may be configured to service the northeastern region of the United States, and resource set 106N may be configured to service the southwestern region of the United States. In another example, resource set 106A may be configured to service the northwestern region of the United States, and resource set 106N may be configured to service the southeastern region of the United States. It is noted that the network-accessible server set may include any number of resource sets, and each resource set may service any number of geographical regions worldwide.

Each of the servers of resource sets 106A-106N may be configured to execute one or more services (including microservices), applications, and/or supporting services. In FIG. 1, one or more servers of resource set 106A may be configured to execute supporting services 114A-114N, and one or more servers of resource set 106N may be configured to execute supporting services 116A-116N. A "supporting service" is a cloud computing service/application configured to manage a set of servers (e.g., a cluster of servers) to operate as network-accessible (e.g., cloud-based) computing resources for users. Examples of supporting services 114A-114N and 116A-116N include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be written in any programming language.

Each of the servers may be configured to execute any number of supporting service, including instances of the same supporting service. In an embodiment, if supporting service 114A, 114N 116A, and 116N are each instances of the same supporting service, then collectively 114A-116N represent a supporting service set.

Each supporting service may be divided, or sliced, into a plurality of slices. For instance, as shown in FIG. 1, supporting service 114A is sliced into slices 102A-102N. Likewise, supporting services 114N, 116A and 116N are each shown sliced into the same slices 102A-102N as supporting service 114A (supporting services between supporting services 114A and 114N and between supporting services 116A and 116N, though not shown in FIG. 1 for reasons of ease of illustration, are likewise sliced/partitioned). Though the servers may include many different hardware configurations (e.g., different configurations of servers, storage, processors, racks, etc.), and many different software configurations (e.g., different operating systems, etc.), each of supporting services 114A-114N and 116A-116N may be sliced into the same plurality of slices 102A-102N. However, this is not to be construed in a limiting sense and the instances of any supporting services can be sliced in any variation, so long as each service portion is included in a slice. For example, supporting service 114A may include slice 102A but not slice 102N, while supporting service 114N may include both of slices 102A and 102N.

Computing devices 150 includes the computing devices of users (e.g., individual users, family users, enterprise users, governmental users, etc.) that access network-accessible resource sets 106A-106N for cloud computing resources through network 110. Computing devices 150 may include any number of computing devices, including tens, hundreds, thousands, millions, or even greater numbers of computing devices. Computing devices of computing devices 150 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing devices 150 may each interface with the servers through application programming interfaces (API)s and/or by other mechanisms. Note that any number of program interfaces may be present.

Computing device(s) 140 perform management functions for resource sets 106A-106N. For instance, as shown in FIG. 1, computing device(s) 140 includes deployment orchestrator 136. Deployment orchestrator 136 is configured to manage the rolling out of updates to supporting services 114A-114N, 116A-116N, etc., operating within resource sets 106A-106N. Deployment orchestrator 136 is configured to receive a software update 120 and manage the application of software update 120 to the supporting services of resource sets 106A-106N. For instance, deployment orchestrator 136 may transmit software update deployment 125 in order to deploy software update 120 to the supporting services in resource sets 106A-106N.

Note that software update 120 may include one or more updates to any number of software and/or firmware components of supporting service 114A, including changes to existing software or firmware (e.g., updated versions), may include new software and/or firmware components for installation, and/or may designate one or more software and/or firmware components for uninstall.

Accordingly, in embodiments, software (which may include firmware) updates are rolled out to network-accessible server infrastructure 118. Deployment orchestrator 136 may perform this rollout in various ways. For instance, FIG. 2 shows a flowchart 200 for rolling out updates to network-accessible server infrastructure 118, according to an example embodiment. In an embodiment, flowchart 200 may be implemented by deployment orchestrator 136. FIG. 2 is described with continued reference to FIG. 1. Other structural and operational embodiments will be apparent to persons skilled in the relevant art(s) based on the following discussion regarding flowchart 200 and system 100 of FIG. 1.

Flowchart 200 begins with step 202. In step 202, an indication is received of a partition of the instances of the supporting service into a plurality of slices, each instance of the supporting service partitioned to include one or more slices of the plurality of slices, each slice of an instance of the supporting service including one or more of the service portions of the instance of the supporting service. For example, with reference to FIG. 1, deployment orchestrator 136 receives a partition indication 108 of the partitioning of supporting services of resource sets 106A-106N into a set of slices. Each slice includes one or more service portions of at least one instance of the instances of the supporting service and each instance of the supporting service includes one or more slices containing one or more service portions included in the instance. For instance, as shown in in FIG. 1, supporting services 114A, 114N, 116A and 116N are each shown partitioned into slices 102A-102N (supporting services between supporting services 114A and 114N and between supporting services 116A and 116N are likewise sliced). Each of slices 102A-102N at a different one of supporting services 114A-114N and 116A-116N may include the same or different service portions as in another of supporting services 114A-116N.

Partition indication 108 may be received in any manner, including being accessed from storage, such as in the form of a file, array, table, etc., that indicates the partitioning of slices 102A-102N (e.g., indicates identifiers for one or more of the servers, services, applications, etc., included in each slice of slices 102A-102N).

In step 204, the software update is deployed to the plurality of instances of the supporting service. For instance, with reference to FIG. 1, deployment orchestrator 136 deploys software update deployment 125 to the supporting services of resource sets 106A-106N, including supporting services 114A-114N and 116A-116N. In one embodiment, deployment orchestrator 136 deploys software update deployment 125 directly at the servers of resource sets 106A-106N. In another embodiment, deployment orchestrator 136 transmits software update deployment 125 to agents at the servers of resource sets 106A-106N, and the agents in turn deploy software update deployment 125 to their respective servers of resource sets 106A-106N. The agents may be implemented in hardware, or hardware combined in one or both of software and firmware, and are configured to deploy software updates. Such agents may be present at the data center level, the cluster level, the rack level, or an agent may run in each server.

A supporting service may be partitioned/sliced into multiple service portions. Each service portion includes one or more software/firmware components of the servers included in the slice, including cloud management code, operating systems (OS), virtual machines, storage device firmware, application services, etc. Each slice across a plurality of instances of the supporting service includes one or more of the service portions of each instance of the supporting service.

For instance, FIG. 3A shows a block diagram of supporting service 114A of FIG. 1, according to an example embodiment. Supporting service 114A includes (is formed by) service portions 310A-310N and 315A-315N (further service portions of supporting service 114A may not be shown in FIG. 3A for ease of illustration). Each of service portions 310A-310N and 315A-315N includes a corresponding portion (e.g., one or more components) of supporting service 114A. As shown in FIG. 3A, supporting service 114A is partitioned into exemplary slices 102A-102N. Each of slices 102A-102N includes one or more service portions (components) of supporting service 114A. For instance, slice 102A includes service portions 310A-310N, and slice 102N includes service portions 315A-315N. As such, each service portion is included in a single slice. Further instances of supporting service 114A (not shown in FIG. 3A) may be partitioned by slices 102A-102N in a similar manner to supporting service 114A, or in different manners. For instance, slice 102A in each supporting service instance may include the same service portions or different service portions.

Figure 3B:
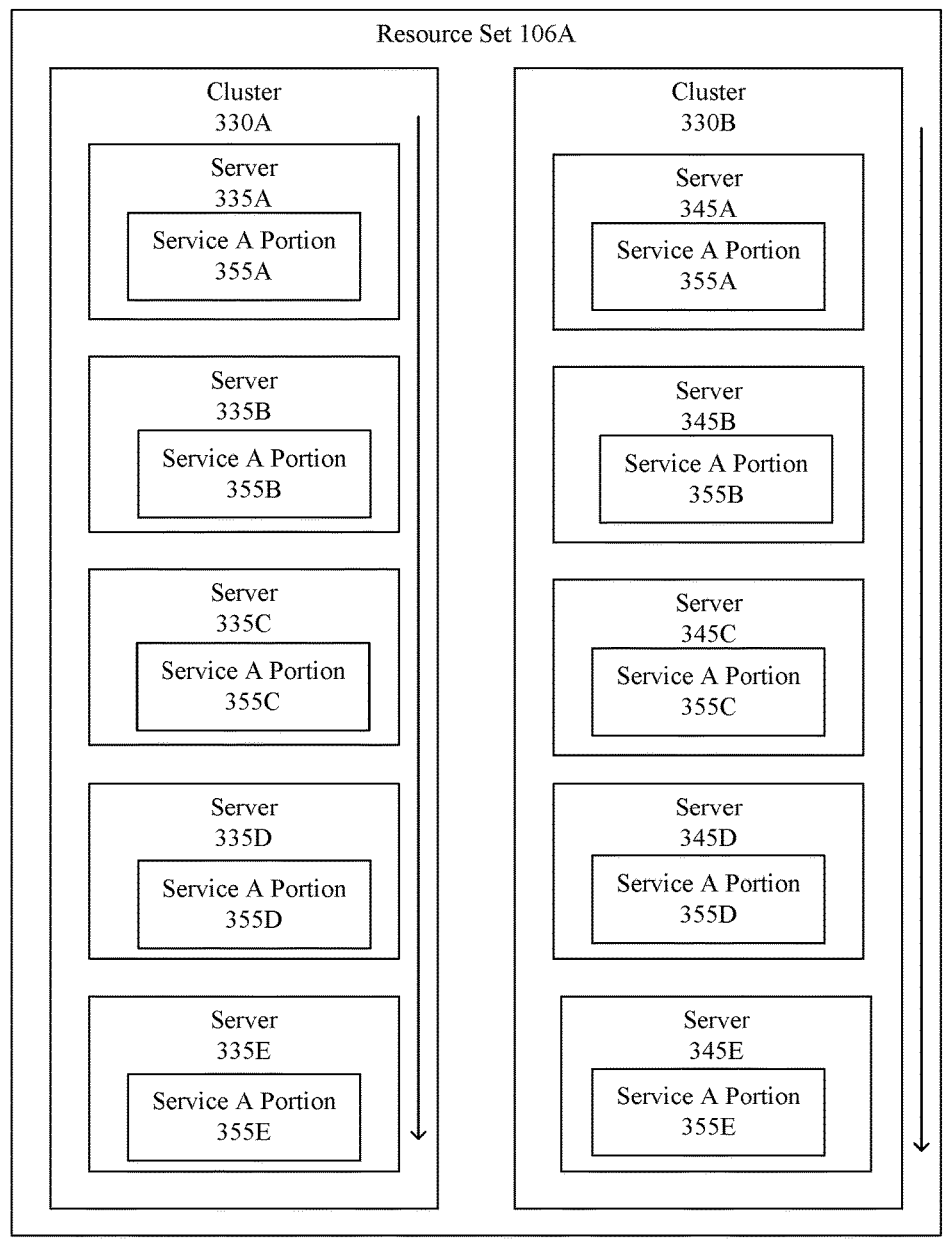
FIG. 3B shows a block diagram of a resource set in a system for rolling out updates to a network-accessible server infrastructure.

Furthermore, as described above, each particular slice may encompass the same or different hardware in different hosting server sets. For instance, FIG. 3B shows a block diagram of resource set 106A. As shown in FIG. 3B, resource set 106A includes a first server cluster 330A and a second server cluster 330B. Each of server clusters 330A and 330B hosts a corresponding instance of a supporting service A. As shown in FIG. 3B, server cluster 330A includes servers 335A, 335B, 335C, 335D, and 335E which include service A portions 355A, 355B, 355C, 355D, and 355E, respectively, making up a complete first instance of the supporting service A. Likewise, cluster 330B includes servers 345A, 345B, 345C, 345D, and 345E which include service A portions 355A, 355B, 355C, 355D, and 355E, respectively, making up a complete second instance of supporting service A. Each instance of a supporting service is independent of other instances of the same supporting service.

In conventional systems, a software update rollout is performed sequentially from server to server in a resource set. For instance, in FIG. 3B, a software rollout may be rolled out in service cluster 330A beginning at server 335A, then to server 335B, and so on, finishing with server 335E. The software update may then be applied to servers 345A-345E in a similar manner. This conventional approach introduces problems, potentially including outages in multiple servers that host an instance of the supporting service in a server set, which may compromise operation of the supporting service in that server set.

According to embodiments, a software update rollout is performed sequentially from slice to slice, rather than server to server. For instance, with respect to FIG. 3B, the instance of service A defined by service A portions 355A-355E may be partitioned into first-fifth slices that respectively include service A portions 355A-355E in cluster 330A. The instance of service A defined by service A portions 355A-355E of cluster 330B may be similarly partitioned into those first-fifth slices. In such an example, the software update may be applied sequentially to the first-fifth slices one at a time, in the order of first to fifth slices. This slice-based update rollout enables controlled application of the software update to software/hardware in a desired sequence defined by the slices rather than merely applying the software update to servers sequentially.

Figure 3C:
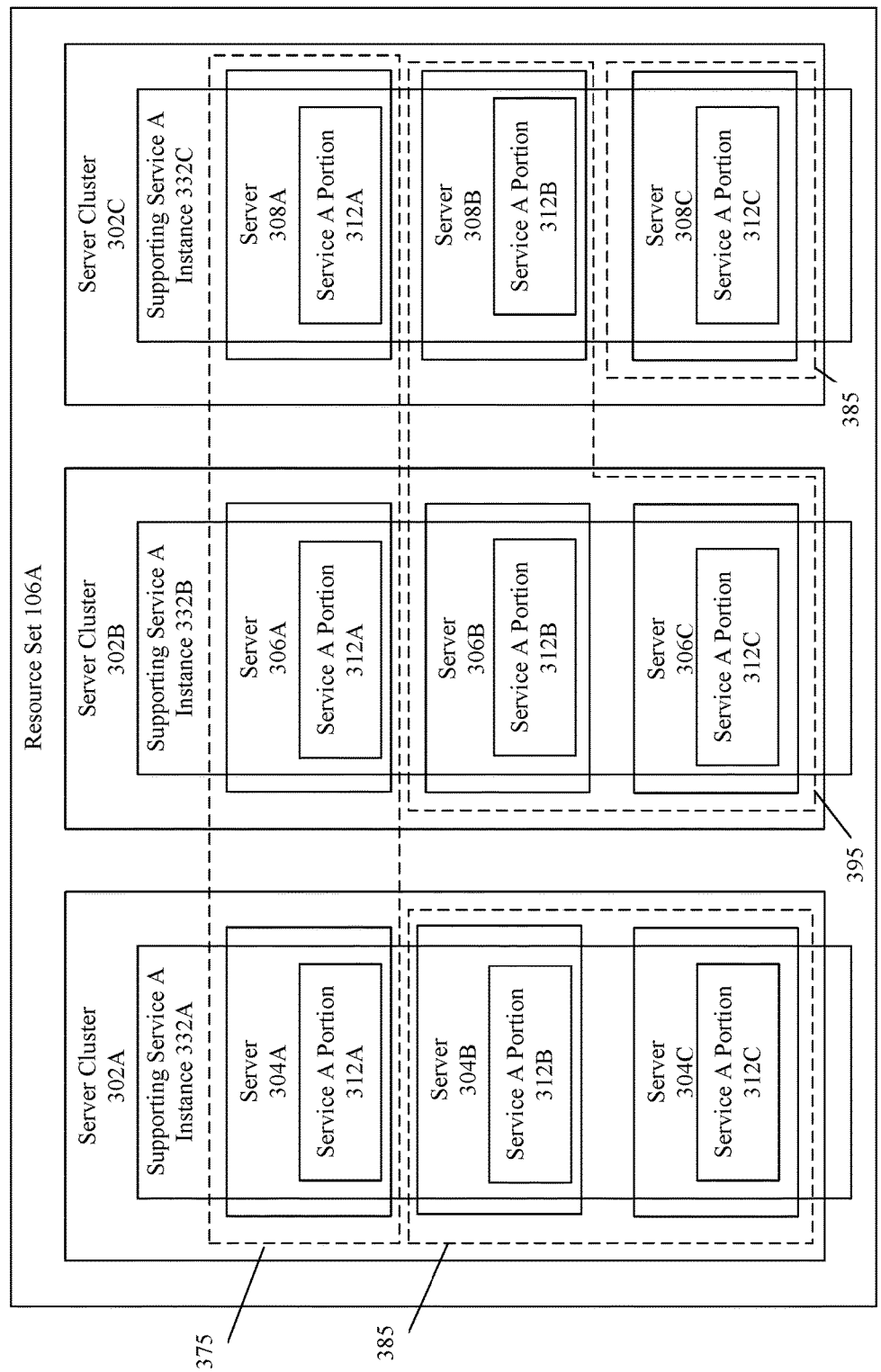
FIG. 3C shows a block diagram of a resource set partitioned into slices, according to an example embodiment.

For instance, FIG. 3C shows an example of resource set 106A configured to receive software updates in slices, according to an exemplary embodiment. As shown in FIG. 3C, resource set 106A includes a first server cluster 302A, a second server cluster 302B, and a third server cluster 302C. A supporting service A that includes service A portions 312A-312C is deployed in each of server clusters 302A-302C. In particular, each of server clusters 302A, 302B, and 302C hosts a corresponding instance of supporting service A. Server cluster 302A includes supporting service A instance 332A, server cluster 302B includes supporting service A instance 332B, and server cluster 302C includes supporting service A instance 332C.

As shown in FIG. 3C, server cluster 302A includes servers 304A-304C, where servers 304A, 304B, and 304C include supporting service A portions 312A, 312B, and 312C, respectively, making up instance 332A. Cluster 302B includes servers 306A-306C, where servers 306A, 304B, and 306C include supporting service A portions 312A, 312B, and 312C, respectively, making up instance 332B. Cluster 302C includes servers 308A-308C, where servers 308A, 308B, and 308C include service A portion 312A, 312B, and 312C, respectively, making up instance 332C. As such, each of instances 332A-332C includes all service portions of supporting service A.

In an embodiment, supporting service A may be sliced into first-third slices 375, 385, and 395. Slice 375 includes service A portion 312A in each of servers 304A, 306A, and 308A. Slice 385 includes service A portions 312B and 312C in servers 304B and 304C and service A portion 312C in server 308C. Slice 395 includes service A portions 312B and 312C in servers 306B and 306C and service A portion 312B in server 308B. As such, service A portions 312A-312C of instances 332A-332C in server clusters 302A-302C are included in slices 375, 385, and 395, with each instance of a service portion being included in a single corresponding slice. Furthermore, as shown in FIG. 3C, a slice (e.g., first slice 375) may contain one or more same service portions (e.g., service A portion 312A) across all instances of the supporting service. Alternatively, a slice (e.g., slice 385) may contain one or more service portions (e.g. service A portion 312B and 312C) at a first instance of the supporting service (e.g., instance 332A) different from one or more service portions (e.g., service portion 312C) contained by the slice at a second instance of the supporting service (e.g., instance 332C). Thus, while every service portion of all supporting services is contained in a slice, a same slice may contain different service portions at different instances of the supporting service.

Updates may be applied to supporting service A on a slice-by-slice basis. When a slice is updated, the service portions contained by that slice at the various instances of the supporting service are updated. For instance, in FIG. 3C, when slice 375 is updated, service A portion 312A in each of instances 332A-332C (in each of server clusters 302A-302C) is updated, while other service portions are not. When slice 385 is updated, service A portions 312B and 312C in instance 332A (in server cluster 302A) and service A portion 312C (in server cluster 302C) are updated, while other service portions are not. Similarly, when slice 395 is updated, service A portions 312B and 312C in instance 332B and service A portion 312B in instance 332C (in server clusters 302B and 302C) are updated, while other service portions are not. In this manner, service portions in different instances of the supporting service, hosted in different server sets (with corresponding hardware/software configurations), may be targeted for update in any desired sequence. This enables the simultaneous updating of the variety of hardware/software configurations contained in a slice, rather than merely updating servers sequentially (as in conventional systems).

Figure 4:
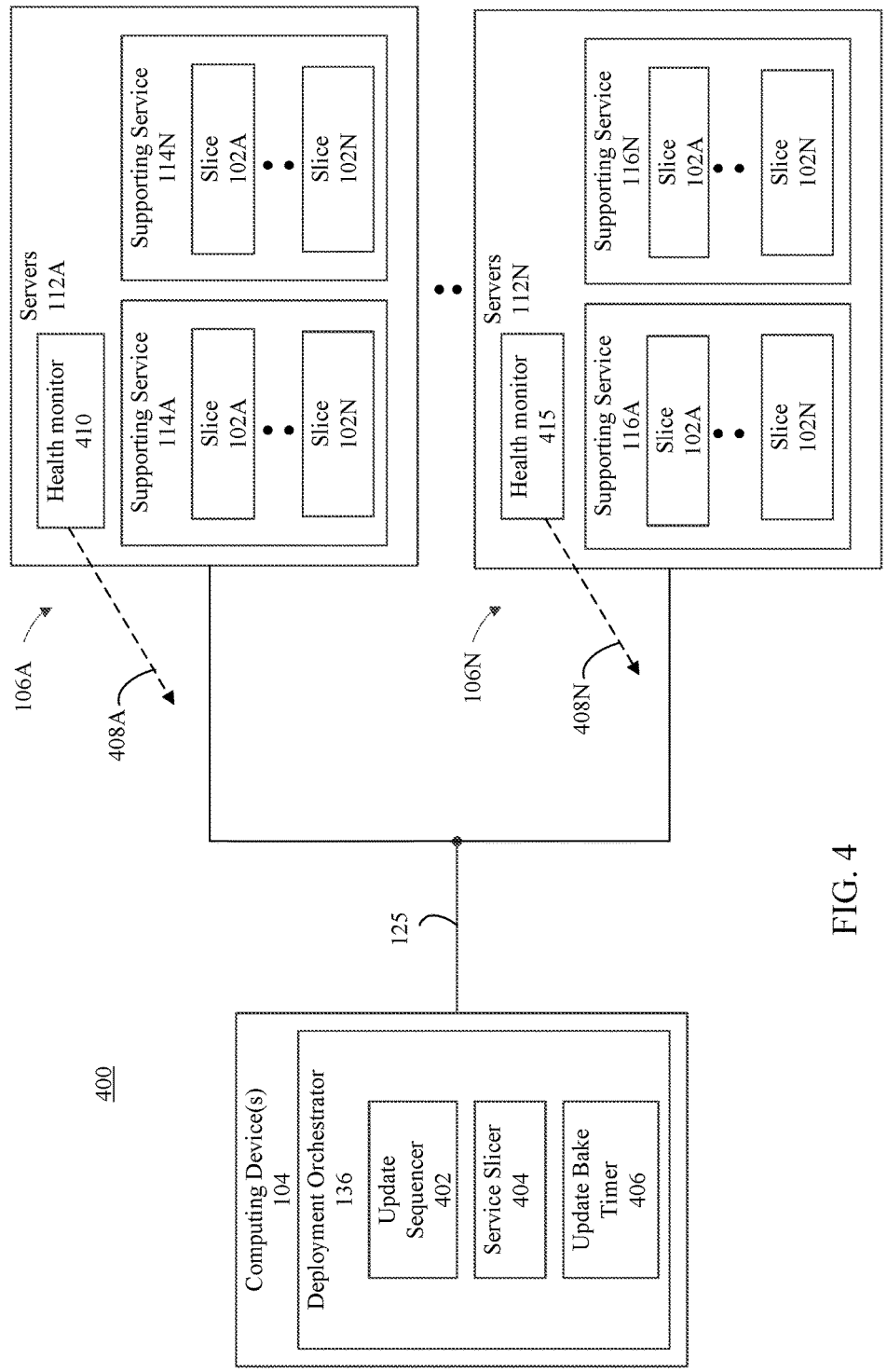
FIG. 4 shows another block diagram of a system for rolling out updates to a network-accessible server infrastructure, according to an example embodiment.

Referring back to FIG. 2, step 204 may be performed in accordance with various embodiments. For instance. FIG. 4 shows a block diagram of a system 400 where software update deployment 125 is deployed by deployment orchestrator 136 to a supporting service set across servers 112A-112N, according to an embodiment. As shown in FIG. 4, system 400 includes computing device(s) 104 and resource sets 106A-106N. Computing device(s) 104 includes deployment orchestrator 136, which includes an update sequencer 402, a service slicer 404, and an update bake timer 406. Resource set 106A includes servers 112A-112N, resource set 106N includes servers 116A-116N (further resource sets are not shown for ease of illustration). Servers 112A includes supporting services 114A-114N and a health monitor 410. Servers 112B includes supporting services 116A-116N and a health monitor 415. Each of supporting services 114A-114N and 116A-116N includes slices 102A-102N. System 400 is described in further detail as follows.

As described above, supporting services 114A-114N and 116A-116N (and further instances of the supporting service not shown in FIG. 4) are partitioned into a set of slices 102A-102N. In an embodiment, service slicer 404 may be present. When present, service slicer 404 is configured to slice the supporting service into slices 102A-102N.

For instance, and as shown in FIG. 4, service slicer 404 may slice supporting services 114A-116N into a plurality of slices, where each slice corresponds to a portion of the supporting service. These slices are independent portions of the supporting service from each other, such that if there is a problem, such as a failure, during deployment of the software update to a slice, the service portions included in the other slices maintain functionality. In an embodiment, service slicer 404 slices the plurality of supporting services such that the slices increase in size in an order of a sequence of the slices. In another embodiment, service slicer 404 slices the plurality of supporting services such that the slices are all of substantially equal size. In still another embodiment, service slicer 404 slices the plurality of supporting services such that the slices decrease in size in an order of the sequence. Service slicer 404 may update the slice slices dynamically. In an embodiment, the supporting service can be divided into service portions such as stage, pilot, canary and broad, which may receive the software update in this order.

Update sequencer 402 is configured to deploy software update 120 to the plurality of supporting services as software update deployment 125. In an embodiment, and as shown in FIG. 4, update sequencer 402 deploys software update deployment 125 to slices 102A-102N of resource sets 106A-106N, including deploying software update deployment 125 to servers 112A of resource set 106A and servers 112N of resource set 106N. Update sequencer 402 deploys software update deployment 125 to slices 102A-102N in sequence such that the software update is applied to a same slice in parallel across the plurality of instances of the supporting service set before being applied to the next slice. For instance, as shown in FIG. 4, software update deployment 125 is first deployed to slice 102A of each of supporting services 114A-114N and 116A-116N in parallel before being deployed to the next slice (i.e., slice 102B, implied but not explicitly shown in the figures). As long as software update deployment 125 does not have problems being deployed, update sequencer 402 continues to deploy software update deployment 125 to the remaining slices in sequence (e.g., slice 102C, slice 102D, etc., implied but not explicitly shown in the figures) until finally deployed to slice 102N.

Update bake timer 406 is configured to cause update sequencer 402 to wait a wait time after applying the software update to a slice, before applying the software update to the next slice. In an embodiment, and as shown in FIG. 4, update bake timer 406 enables update sequencer 402 to deploy software update deployment 125 to slice 102A, and causes update sequencer 402 to waits a wait time before enabling update sequencer 402 to deploy the software update to the next slice (i.e., slice 102B, implied but not explicitly shown in the figures). In an embodiment, each wait time between slices is a same period of time. In another embodiment, the wait time is dynamically updated, such that different wait times are waited between deployments of software update deployment 125 to slices. For example, in an embodiment, the wait time is decreased after each deployment of the software update to a slice of the supporting service instances. In still another embodiment, the wait time is set by the user.

Monitoring may be used to determine failure or success of a deployment of a software update to servers on a slice-by-slice basis. In an embodiment, health monitors may be present that are configured to generate health status signals. For instance, and as shown in FIG. 4, servers 112A includes health monitor 410 and servers 112N includes health monitor 415. Health monitors 410 and 415 dynamically transmit health signals 408A and 408N, respectively, for servers 112A and 112N to deployment orchestrator 136. Health monitors 410 and 416 may detect any number and type of problems related to servers 112A and 112N, respectively, including failures and/or other problems caused by the software update related to hardware (e.g., processor failures, node failures, storage failures, data transmitter/receiver failures, etc.), network failures (e.g., packet errors, network switch failures, etc.), software failures (e.g., virtual machine failures, OS failures, application failures), installation errors, uninstall errors, etc. Health status signals 408A and 408N may indicate any of these problems in corresponding error messages, warning messages, alerts, etc. Accordingly, in an embodiment, if deployment orchestrator 136 receives a health status signal indicating one or more significant, including critical, problems, software update deployment 125 may be delayed, terminated, and/or rolled back, and a user of computing device(s) may be alerted so that the problem(s) can be investigated. It is noted that health status signals 408A and 408 may also indicate successful deployment of the software update to their respective resource sets.

In an embodiment, health monitor 410 and health monitor 415 are configured to monitor the slices for failures or other problem caused by the software update. For instance, as shown in FIG. 4, after software update deployment 125 is deployed to both instances of slice 102A at servers 112A, the instances of slice 102A are continuously monitored by health monitor 410 at servers 112A to determine whether a failure or other problem occurs. Likewise, health monitor 415 monitors both instances of slice 102A at servers 112N after deployment of software update deployment 125. In an embodiment, a health monitor is configured to delay, terminate, and/or rollback the rollout of software update deployment 126 if a problem (i.e., a bad health signal) is detected, depending on the type and severity of the problem. For instance, if a failure occurs when software update deployment 125 is rolled out to the instances of slice 102A, software update deployment 125 may be terminated as to further slices, and the affected component(s) of slice 102A may be investigated by the user. In this manner, problems with software updates may be pinpointed to a particular slice of the supporting service, and in particular, to specific software, firmware, and/or hardware.

Note that any number of health monitors may be present in a resource set, including one or more per resource set, per cluster, per rack, and/or per server.

In an embodiment, computing device(s) 104 receive health status signals, and if one or more problems with regard to the supporting service are indicated, may categorize each problem in into one of several categories, such as: complete failure of the supporting service, partial failure of the supporting service, delayed/latent complete failure of the supporting service, or delayed/latent partial failure of the supporting service.

Accordingly, in embodiments, deployment orchestrator 136 deploys software updates to each of the instances of the supporting service, which ma) include any number of instances (e.g., in the tens, hundreds, thousands, etc.). As described above, the software update is deployed across the instances of the supporting service according to a sequence of slices, one slice being updated at a time, the same slice in all the supporting services being updated in parallel. Such deployment may be performed in any manner.

For instance, FIG. 5 shows a flowchart 500 for deploying a software update in a sequence of slices, according to an example embodiment. Flowchart 500 may be implemented by deployment orchestrator 136 of FIGS. 1 and 4, in embodiments. FIG. 5 is described as follows. Other structural and operational embodiments will be apparent to persons skilled in the relevant art(s) base on the following discussion regarding flowchart 500.

Flowchart 500 begins with step 502. In step 502, the application of the software update to the slices is sequenced such that the software update is applied to a same slice in parallel across the instances of the supporting service containing that same slice before being applied to a next slice, where at least a first applied slice in the sequence has substantially complete configuration diversity coverage of the network-accessible server infrastructure. For example, with reference to FIG. 4, if software update deployment 125 is to be rolled out to each of supporting services 114A-114N and 116A-116N, update sequencer 402 sequences the deployment of software update deployment 125 across slices 102A-102N by first applying the update in parallel to each instance of slice 102A across all of the instances of the supporting service containing slice 102A. After the instances of slice 102A have been updated, software update deployment 125 may be applied to the next slice in a similar manner. Each slice in the sequence is updated in the order of the sequence, with slice 102N being the last slice to be updated in parallel across the supporting services.

As indicated in step 502, at least a first applied slice in the sequence has substantially complete configuration diversity coverage of network-accessible server infrastructure 118 (FIG. 1). "Substantially complete configuration diversity coverage" for a slice means that the slice includes a sufficiently complete variety of resources of resource sets 106A-106N (e.g., servers, storage, etc.) in which the supporting service operates, such that when software update 120 is applied to the slice, at least one instance of any hardware device types, hardware device configurations, software configurations, and/or firmware configurations of the resources within resource sets 106A-106N receive software update 120. In this manner, software update 120 is thoroughly tested just by being applied to a single slice, even though the slice may include a relatively small percentage of all of the resources of resource sets 106A-106N, because the slice completely covers the diversity of device configurations of resource sets 106A-106N. In other words, "substantially complete configuration diversity coverage" means the slice contains portions of the supporting service hosted by a substantially complete variety of the hardware/software configurations of resource sets 106A-106N defining the network-accessible server infrastructure. This enables thorough testing of software update 120 against this variety of hardware/software configurations of the network-accessible server infrastructure, so that if the software update is applied to the service portions of the supporting service in the slice with few to no significant problems cropping up, relatively high confidence may be gained that the software update can be applied against the service portions in the rest of the slices with relatively low probability of problems (enabling the software update to be applied to increasing larger slices and/or with decreasing wait times).

In an embodiment, the first slice of the sequence (slice 102A) is configured to have substantially complete configuration diversity coverage of resource sets 106A-106N. In further embodiments, additional slices in the sequence of slices 102A-102N may be configured to have substantially complete configuration diversity coverage, including an embodiment where all of slices 102A-102N have substantially complete configuration diversity coverage. In such an embodiment, the complete configuration diversity of resource sets 106A-106N is tested at application of the update to each slice in the sequence.

Referring back to FIG. 5, in step 504, a wait time is waited after applying the software update to a slice of the plurality of slices before applying the software domain to a next slice of the plurality of slices in the sequence. For example, update bake timer 406 of FIG. 4 is configured waits a wait time after software update deployment 125 is applied to the instances of slice 102A across supporting services 114A-114N and 116A-116N (and the other instances of the supporting service) before applying software update deployment 125 to a next slice. This wait time is used to allow the resources of slice 102A to operate with software update 120 applied, so that if there are problems (e.g., bugs, etc.) with software update 120, those problems will hopefully arise during the wait time, enabling further deployment of software update deployment 125 to be delayed, terminated, rolled back, etc., before being deployed to the next slice and potentially spreading the problems across further resources of network-accessible server infrastructure 118.

As described above, in an embodiment, service slicer 404 may be present to slice the supporting service into slices that each include a corresponding portion of the service. For instance, FIG. 6 shows a flowchart 600 for forming slices, according to an example embodiment. In an embodiment, flowchart 600 may be implemented by service slicer 404 of deployment orchestrator 136, as shown in FIG. 4. Other structural and operational embodiments will be apparent to persons skilled in the relevant art(s) based on the following discussion regarding flowchart 600.

Flowchart 600 begins with step 602. In step 602, the instances of the supporting service are sliced into a plurality of slices. For example, with reference to FIG. 4, to prepare to roll out software update deployment 125 to the instances of the supporting service, service slicer 404 slices the instances of the supporting service into slices 102A-102N. In this manner, software update deployment may be applied first to slice 102A before waiting a wait time and then being applied to a next slice, etc.

In an embodiment, service slicer 404 may be configured to slice the supporting service into the plurality of slices, such that one or more of the slices have substantially complete configuration diversity coverage. For instance, FIG. 7 shows a flowchart 700 for forming slices having substantially complete configuration diversity of a target network-accessible server platform, according to an example embodiment. In an embodiment, flowchart 700 may be implemented by service slicer 404 of FIG. 4. Other structural and operational embodiments will be apparent to persons skilled in the relevant art(s) based on the following discussion regarding flowchart 700.

Flowchart 700 begins with step 702. In step 702, the plurality of slices are configured to have substantially complete configuration diversity coverage. For example, as shown in FIG. 4, service slicer 404 may be configured to slice the supporting service into slices 102A-102N such that substantially complete configuration diversity coverage exists in one or more of the slices. For example, to generate a substantially complete configuration diversity coverage for a slice, service slicer 404 may inventory all hardware/software configurations of resources in network-accessible server infrastructure 118, and may include at least one instance of each hardware/software configuration (e.g., server model, processor configuration, OS version, etc.) in the slice.

Figure 8:
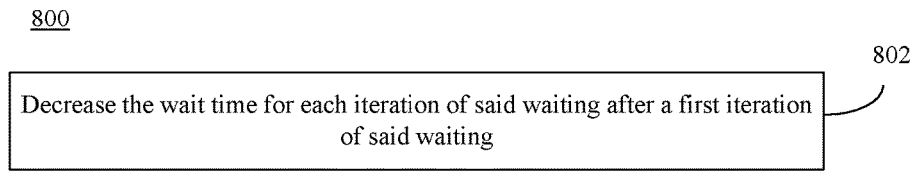
FIG. 8 shows a flowchart for modifying wait times during a software update, according to an example embodiment.

As described above, deployment orchestrator 136 waits a wait time after applying the software update to a slice before applying the software domain to a next slice in the sequence. In an embodiment, the wait time may be decreased for each iteration of waiting due to increasing confidence in the software update. For instance, FIG. 8 shows a flowchart 800 for using changing wait times during a software update, according to an example embodiment. In an embodiment, flowchart 800 may be implemented by update back timer 406, as shown in FIG. 4. Other structural and operational embodiments will be apparent to persons skilled in the relevant art(s) based on the following discussion regarding flowchart 800.

Flowchart 800 begins with step 802. In step 802, the wait time is decreased for each iteration of said waiting after a first iteration of said waiting. For example, update bake timer 406 may decrease the wait time after applying the software update to slice 102A before enabling software update deployment 125 to be applied to a next slice across supporting services 114A-114N and 116A-116N. The wait time may be decreased for some or all iterations of waiting before applying software update deployment 125 to a next slice. This reduction in wait times speeds up the overall application of the software update to all slices relative to continuing to use the original wait time after each application of the software update to the slices.

Figure 9:
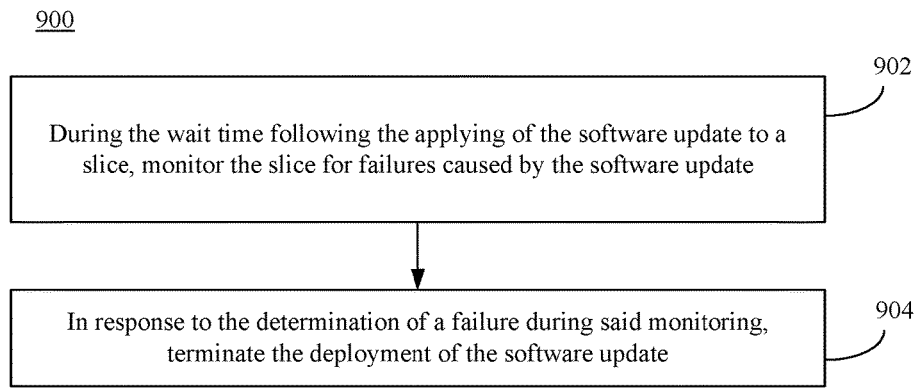
FIG. 9 shows a flowchart for monitoring a software update for failures, according to an example embodiment.

In embodiments, the slices may be monitored for problems caused by the software update (e.g., due to bugs, coding errors, etc.). In response to a problem, the deploying may be delayed, terminated, and/or rolled back. For instance, FIG. 9 shows a flowchart 900 for monitoring a software update for failures, according to an example embodiment. In an embodiment, flowchart 900 may be implemented by update bake timer 406, as shown in FIG. 4. Other structural and operational embodiments will be apparent to persons skilled in the relevant art(s) based on the following discussion regarding flowchart 900.

Flowchart 900 begins with step 902. In step 902, during the wait time following the applying of the software update to a slice, the slice is monitored for failures caused by the software update. For example, update bake timer 406 of FIG. 4 may be configured to receive health signals from health monitors associated with resource sets 106A-106N, including health monitors 410 and 415, to determine if a problem caused by the software update occurs. As described above, health monitors 410 and 415 are configured to transmit health status signals 408A, 408N, respectively, related to resource sets 106A and 106B, respectively, to update bake timer 406.

In step 904, the deploying of the software update is terminated in response to a failure being determined during said monitoring. For example, if update bake timer 406 determines from a health status signal that a failure is caused by the software update, update bake timer 406 may instruct update sequencer 502 to delay or terminate further application of software update deployment 125, and optionally to rollback software update deployment 125 (e.g., uninstall) from one or more slices.

III. Example Computer System Implementation

Computing device(s) 104, resource sets 106A-106N, servers 112A-112N, deployment orchestrator 136, computing devices 150, update sequencer 402, service slicer 404, update bake timer 406, health monitor 410, health monitor 415, flowchart 200, flowchart 500, flowchart 600, flowchart 700, flowchart 800, and flowchart 900 may be implemented in hardware, or hardware combined with software and/or firmware. For example, deployment orchestrator 136, update sequencer 402, service slicer 404, update bake timer 406, health monitor 410, health monitor 415, flowchart 200, flowchart 500, flowchart 600, flowchart 700, flowchart 800, and/or flowchart 900 may be implemented as computer program code/instructions configured to be executed in one or more processors and stored in a computer readable storage medium. Alternatively, deployment orchestrator 136, update sequencer 402, service slicer 404, update bake timer 406, health monitor 410, health monitor 415, flowchart 200, flowchart 500, flowchart 600, flowchart 700, flowchart 800, and/or flowchart 900 may be implemented as hardware logic/electrical circuitry.

For instance, in an embodiment, one or more, in any combination, of deployment orchestrator 136, update sequencer 402, service slicer 404, update bake timer 406, health monitor 410, health monitor 415, flowchart 200, flowchart 500, flowchart 600, flowchart 700, flowchart 800, and/or flowchart 900 may be implemented together in a SoC.

The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
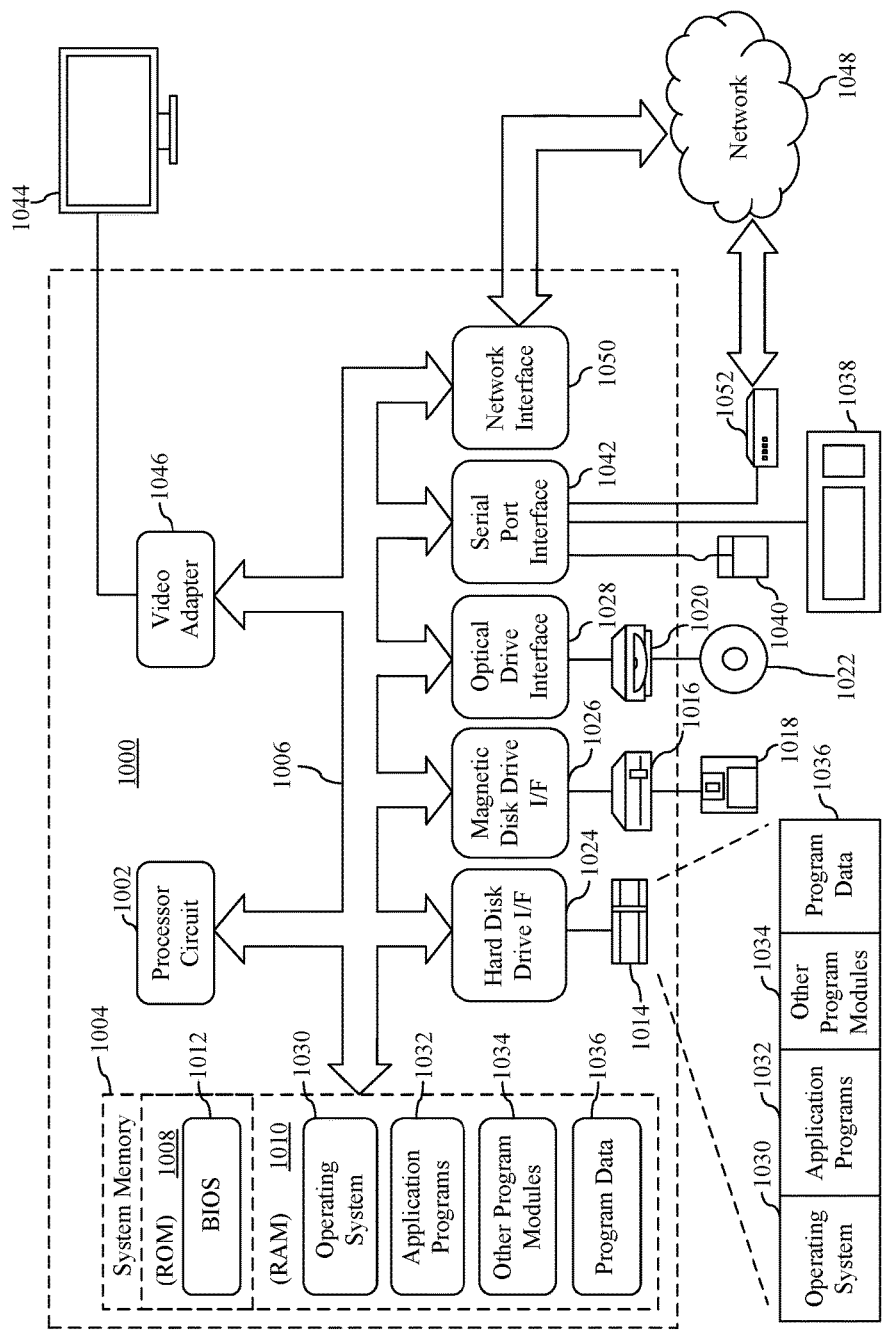
FIG. 10 is a block diagram of an example processor-based computer system that may be used to implement various embodiments.

FIG. 10 depicts an exemplary implementation of a computing device 1000 in which embodiments may be implemented. For example, computing device(s) 140, computing devices 150, and/or servers 112A-112N may each be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing deployment orchestrator 136, update sequencer 402, service slicer 404, update bake timer 406, health monitor 410, health monitor 415, flowchart 200, flowchart 500, flowchart 600, flowchart 700, flowchart 800, and/or flowchart 900 (including any suitable step of flowcharts 200, 500, 900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium." "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM. RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method is described herein of rolling out updates to a network-accessible server infrastructure which operates a plurality of instances of a supporting service, the supporting service comprised by a plurality of service portions, the instances of the supporting service each including the plurality of service portions. The method includes: receiving an indication of a partition of the instances of the supporting service into a plurality of slices, each instance of the supporting service partitioned to include one or more slices of the plurality of slices, each slice of an instance of the supporting service including one or more of the service portions of the instance of the supporting service; and deploying a software update to the plurality of instances of the supporting service by applying the software update to the slices in a sequence such that the software update is applied to a same slice in parallel across the instances of the supporting service containing that same slice before being applied to a next slice, at least a first applied slice in the sequence having substantially complete configuration diversity coverage of the network-accessible server infrastructure, and waiting a wait time after each applying of the software update to a slice of the plurality of slices before applying the software domain to a next slice of the plurality of slices in the sequence.

In one embodiment of the foregoing method, all slices of the plurality of slices have substantially complete configuration diversity coverage of the network-accessible server infrastructure.

In another embodiment of the foregoing method, the substantially complete configuration diversity coverage of the network-accessible server infrastructure includes at least one of: substantially complete configuration diversity coverage of server hardware configurations included in the network-accessible server infrastructure, or substantially complete configuration diversity coverage of server software configurations included in the network-accessible server infrastructure.

In another embodiment of the foregoing method, the method further comprises: slicing the instances of the supporting service into the plurality of slices such that the slices increase in size in the sequence.

In another embodiment, the waiting comprises: decreasing the wait time for each iteration of said waiting after a first iteration of said waiting.

In another embodiment, the waiting comprises: during the wait time following the applying of the software update to a slice, monitoring the slice for failures caused by the software update; and terminating said deploying of a failure caused by the software update is determined during said monitoring.

In another embodiment, the instances of the supporting service are distributed over a plurality of geographic regions, each geographic region including at least one data center that hosts at least one instance of the supporting service, and each data center including a respective server set.

A system is described herein. The system, includes: at least one processor circuit; and at least one memory that stores program code configured to be executed by the at least one processor circuit, the program code comprising: a deployment orchestrator configured to roll out updates in a network-accessible server infrastructure which operates a plurality of instances of a supporting service, the supporting service comprised by a plurality of service portions, the instances of the supporting service each including the plurality of service portions, the deployment orchestrator configured to receive an indication of a partition of the instances of the supporting service into a plurality of slices, each instance of the supporting service partitioned to include one or more slices of the plurality of slices, each slice of an instance of the supporting service including one or more of the service portions of the instance of the supporting service, and to deploy a software update to the plurality of instances of the supporting service, the deployment orchestrator including an update sequencer configured to apply the software update to the slices in a sequence such that the software update is applied to a same slice in parallel across the instances of the supporting service containing that same slice before being applied to a next slice, at least a first applied slice in the sequence has substantially complete configuration diversity coverage of the network-accessible server infrastructure, and an update bake timer configured to enact a wait time after each applying of the software update to a slice of the plurality of slices by the update sequencer before enabling the update sequencer to apply the software domain to a next slice of the plurality of slices in the sequence.

In one embodiment of the foregoing system, all slices of the plurality of slices have substantially complete configuration diversity coverage of the network-accessible server infrastructure.

In another embodiment of the foregoing system, the substantially complete configuration diversity coverage of the network-accessible server infrastructure includes at least one of: substantially complete configuration diversity coverage of server hardware configurations included in the network-accessible server infrastructure, or substantially complete configuration diversity coverage of server software configurations included in the network-accessible server infrastructure.

In another embodiment of the foregoing system, the deployment orchestrator further comprises: a server slicer configured to slice the instances of the supporting service into the plurality of slices such that the slices increase in size in the sequence.

In another embodiment of the foregoing system, the update bake timer is further configured to decrease the wait time for each enacting of the wait time subsequent to a first enactment of the wait time.

In another embodiment of the foregoing system, the update bake timer is further configured to: receive an indication of the failure caused by the software update; and terminate the deploying of the software update if an indication of the failure caused by the software update is received.

In another embodiment of the foregoing system, the instances of the supporting service are distributed over a plurality of geographic regions, each geographic region including at least one data center that hosts at least one instance of the supporting service, and each data center including a respective server set.

A computer-readable storage medium having program instructions recorded thereon that, when executed by at least one processing circuit, perform a method on a first computing device for rolling out updates to a network-accessible server infrastructure which operates a plurality of instances of a supporting service, the supporting service comprised by a plurality of service portions, the instances of the supporting service each including the plurality of service portions, is described herein. The method includes: receiving an indication of a partition of the instances of the supporting service into a plurality of slices, each instance of the supporting service partitioned to include one or more slices of the plurality of slices, each slice of an instance of the supporting service including one or more of the service portions of the instance of the supporting service; and deploying a software update to the plurality of instances of the supporting service by applying the software update to the slices in a sequence such that the software update is applied to a same slice in parallel across the instances of the supporting service containing that same slice before being applied to a next slice, at least a first applied slice in the sequence having substantially complete configuration diversity coverage of the network-accessible server infrastructure, and waiting a wait time after each applying of the software update to a slice of the plurality of slices before applying the software domain to a next slice of the plurality of slices in the sequence In one embodiment of the foregoing computer-readable storage medium, all slices of the plurality of slices have substantially complete configuration diversity coverage of the network-accessible server infrastructure.

In another embodiment of the foregoing computer-readable storage medium, the computer-readable storage medium further comprises: slicing the instances of the supporting service into the plurality of slices such that the slices increase in size in the sequence.

In another embodiment of the foregoing computer-readable storage medium, the waiting comprises: decreasing the wait time for each iteration of said waiting after a first iteration of said waiting.

In another embodiment of the foregoing computer-readable storage medium, said waiting comprises: during the wait time following the applying of the software update to a slice, monitoring the slice for failures caused by the software update; and terminating said deploying of a failure caused by the software update is determined during said monitoring.

In another embodiment of the foregoing computer-readable storage medium, the instances of the supporting service are distributed over a plurality of geographic regions, each geographic region including at least one data center that hosts at least one instance of the supporting service, and each data center including a respective server set.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of rolling out updates to a network-accessible server infrastructure which operates a plurality of instances of a supporting service, the supporting service comprised by a plurality of service portions, the instances of the supporting service each including the plurality of service portions, the method comprising:
   receiving an indication of a partition of the instances of the supporting service into a plurality of slices, each instance of the supporting service partitioned to include one or more slices of the plurality of slices, each slice of an instance of the supporting service including one or more of the service portions of the instance of the supporting service; and
   deploying a software update to the plurality of instances of the supporting service by
      applying the software update to the plurality of slices in a sequence such that the software update is applied to a same slice in parallel across the instances of the supporting service containing that same slice before being applied to a next slice and
      waiting a wait time after each applying of the software update to a slice of the plurality of slices before applying the software domain to a next slice of the plurality of slices in the sequence.

2. The method of claim 1, wherein a first slice of the plurality of slices has complete configuration diversity coverage of the network-accessible server infrastructure.

3. The method of claim 1, wherein a first slice of the plurality of slices has at least one of:
   complete configuration diversity coverage of server hardware configurations included in the network-accessible server infrastructure, or
   complete configuration diversity coverage of server software configurations included in the network-accessible server infrastructure.

4. The method of claim 1, further comprising:
   slicing the instances of the supporting service into the plurality of slices such that the slices increase in size in the sequence.

5. The method of claim 1, wherein said waiting comprises:
   decreasing the wait time for each iteration of said waiting after a first iteration of said waiting.

6. The method of claim 1, wherein said waiting comprises:
   during the wait time following the applying of the software update to a slice, monitoring the slice for failures caused by the software update; and
   in response to the determination of a failure during said monitoring, terminating said deploying of the software update.

7. The method of claim 1, wherein in a first instance of the instances of the supporting service, a first slice of the plurality of slices includes a first set of the service portions, and
   in a second instance of the instances of the supporting service, the first slice of the plurality of slices includes a second set of the service portions that is different from the first set of the service portions.

8. A system, comprising:
   at least one processor circuit; and
   at least one memory that stores program code configured to be executed by the at least one processor circuit, the program code comprising:
      a deployment orchestrator configured to roll out updates in a network-accessible server infrastructure which operates a plurality of instances of a supporting service, the supporting service comprised by a plurality of service portions, the instances of the supporting service each including the plurality of service portions, the deployment orchestrator configured to receive an indication of a partition of the instances of the supporting service into a plurality of slices, each instance of the supporting service partitioned to include one or more slices of the plurality of slices, each slice of an instance of the supporting service including one or more of the service portions of the instance of the supporting service, and deploy a software update to the plurality of instances of the supporting service, the deployment orchestrator including
an update sequencer configured to apply the software update to the slices in a sequence such that the software update is applied to a same slice in parallel across the instances of the supporting service containing that same slice before being applied to a next slice and
an update bake timer configured to enact a wait time after each applying of the software update to a slice of the plurality of slices by the update sequencer before enabling the update sequencer to apply the software domain to a next slice of the plurality of slices in the sequence.

9. The system of claim 8, wherein a first slice of the plurality of slices has complete configuration diversity coverage of the network-accessible server infrastructure.

10. The system of claim 8, wherein a first slice of the plurality of slices has at least one of:
complete configuration diversity coverage of server hardware configurations included in the network-accessible server infrastructure, or
complete configuration diversity coverage of server software configurations included in the network-accessible server infrastructure.

11. The system of claim 8, wherein the deployment orchestrator further comprises:
a server slicer configured to slice the instances of the supporting service into the plurality of slices such that the slices increase in size in the sequence.

12. The system of claim 8, wherein the update bake timer is further configured to decrease the wait time for each enacting of the wait time subsequent to a first enactment of the wait time.

13. The system of claim 8, wherein the update bake timer is further configured to:
receive an indication of the failure caused by the software update; and
terminate the deploying of the software update if an indication of the failure caused by the software update is received.

14. The system of claim 8, wherein in a first instance of the instances of the supporting service, a first slice of the plurality of slices includes a first set of the service portions, and in a second instance of the instances of the supporting service, the first slice of the plurality of slices includes a second set of the service portions that is different from the first set of the service portions.

15. A computer-readable storage medium having program instructions recorded thereon that, when executed by at least one processing circuit, perform a method on a first computing device for rolling out updates to a network-accessible server infrastructure which operates a plurality of instances of a supporting service, the supporting service comprised by a plurality of service portions, the instances of the supporting service each including the plurality of service portions, the method comprising:

receiving an indication of a partition of the instances of the supporting service into a plurality of slices, each instance of the supporting service partitioned to include one or more slices of the plurality of slices, each slice of an instance of the supporting service including one or more of the service portions of the instance of the supporting service; and deploying a software update to the plurality of instances of the supporting service by
applying the software update to the slices in a sequence such that the software update is applied to a same slice in parallel across the instances of the supporting service containing that same slice before being applied to a next slice and
waiting a wait time after each applying of the software update to a slice of the plurality of slices before applying the software domain to a next slice of the plurality of slices in the sequence.

16. The computer-readable storage medium of claim 15, wherein a first slice of the plurality of slices has complete configuration diversity coverage of the network-accessible server infrastructure.

17. The computer-readable storage medium of claim 15, further comprising:
slicing the instances of the supporting service into the plurality of slices such that the slices increase in size in the sequence.

18. The computer-readable storage medium of claim 15, wherein said waiting comprises:
decreasing the wait time for each iteration of said waiting after a first iteration of said waiting.

19. The computer-readable storage medium of claim 15, wherein said waiting comprises:
during the wait time following the applying of the software update to a slice, monitoring the slice for failures caused by the software update; and
in response to the determination of a failure during said monitoring, terminating said deploying of the software update.

20. The computer-readable storage medium of claim 15, wherein in a first instance of the instances of the supporting service, a first slice of the plurality of slices includes a first set of the service portions, and
in a second instance of the instances of the supporting service, the first slice of the plurality of slices includes a second set of the service portions that is different from the first set of the service portions.

* * * * *